US012234004B1

(12) United States Patent
Groninga et al.

(10) Patent No.: US 12,234,004 B1
(45) Date of Patent: Feb. 25, 2025

(54) AIRCRAFT DOOR HANDLE AND LIGHTING SYSTEM

(71) Applicant: Textron Aviation Inc., Wichita, KS (US)

(72) Inventors: Rebecca Rae Groninga, Maize, KS (US); Clayton Auther Richards, Wichita, KS (US); Zonmong Alexander Lor, Wichita, KS (US); Merril Binford Williams, Wichita, KS (US); Sergio Ricardo Martinez, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/488,740

(22) Filed: Oct. 17, 2023

(51) Int. Cl.
*B64C 1/14* (2006.01)
*B64D 47/04* (2006.01)

(52) U.S. Cl.
CPC ............ *B64C 1/1423* (2013.01); *B64D 47/04* (2013.01)

(58) Field of Classification Search
CPC .............. B64D 2045/007; B64D 47/04; B64D 47/02; B64C 1/1423; B64C 1/143
See application file for complete search history.

(56) References Cited

U.S. PATENT DOCUMENTS

| 8,369,678 | B2 | | 2/2013 | Chakmakjian et al. |
| 8,393,572 | B2 | | 3/2013 | Budinger et al. |
| 8,952,828 | B2 | | 2/2015 | Kohlmeier-Beckmann et al. |
| 9,415,720 | B2 | | 8/2016 | Yoshiguchi et al. |
| 9,469,389 | B2 | * | 10/2016 | Heinen ................. B64C 1/1461 |
| 10,207,818 | B2 | * | 2/2019 | Besettes ................ H04N 23/56 |
| 11,465,772 | B2 | * | 10/2022 | Schallenberg ......... B60Q 1/484 |
| 12,054,286 | B2 | * | 8/2024 | Pozzi .................... B60Q 1/547 |
| 2009/0129105 | A1 | * | 5/2009 | Kusu .................... B60Q 1/2669 |
| | | | | 362/464 |

FOREIGN PATENT DOCUMENTS

WO    WO-2024015482 A1 *  1/2024  ........... B64C 1/1423

OTHER PUBLICATIONS

WO 2024015482 A1 (Year: 2024).*

* cited by examiner

*Primary Examiner* — Brian M O'Hara
(74) *Attorney, Agent, or Firm* — Avek IP, LLC

(57) ABSTRACT

An aircraft door handle and lighting system for an entryway on an aircraft. The system includes a face plate with recessed areas. One recessed area includes a handle positioned for a user to grasp when entering or exiting the aircraft, and another recessed area includes a light source configured to direct light towards one or more stairs. Another recessed area is configured on the opposite side of the entryway and includes a light source configured to direct light towards the stairs.

20 Claims, 6 Drawing Sheets

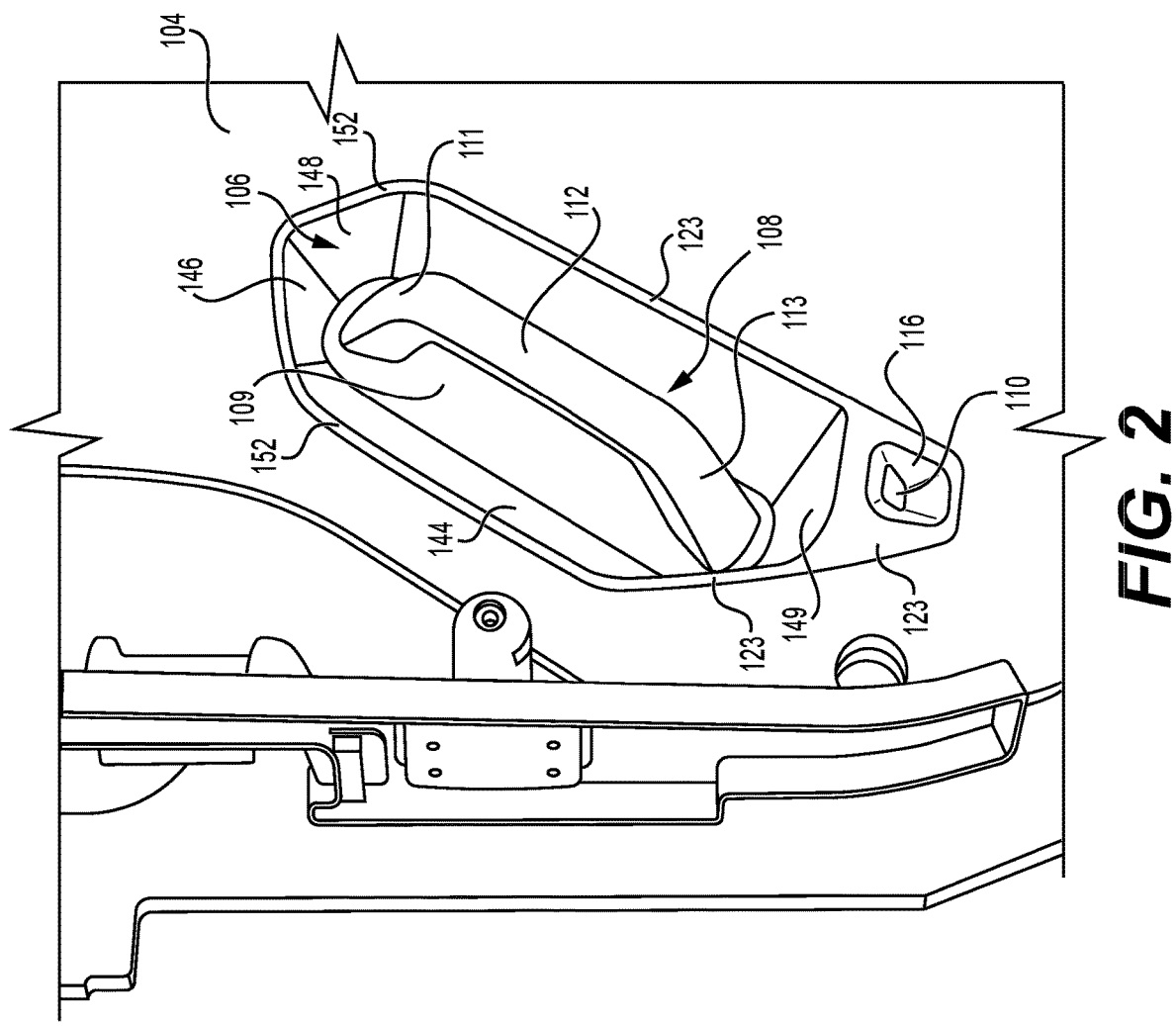

AIRCRAFT DOOR HANDLE AND LIGHTING SYSTEM

CROSS-REFERENCE TO RELATED APPLICATIONS

None.

BACKGROUND OF THE INVENTION

1. Field

The disclosed embodiments relate generally to the field of aircraft interiors.

More specifically, the disclosed embodiments relate to aircraft door handles.

2. Description of the Related Art

It is known for an aircraft to have an entry staircase with a light. For example, in U.S. Pat. No. 10,207,818 to Besettes et al. discloses a method and system on an aircraft door for displaying the external environment of an aircraft including a system using an array of LED lights to illuminate an area outside the aircraft door for a video display to show an area exterior of the aircraft prior to the door being opened.

It is also known for an aircraft to have a system providing guiding illumination in an aircraft. For example, in U.S. Pat. No. 8,369,678 to Chakmakijian et al. discloses a system for providing optimizing illumination designs in an aircraft using a plurality of light guiding structures incorporated into walls, floors, or exit structures of an aircraft.

It is also known in the prior art to illuminate an aircraft stairway by incorporating the light sources into the staircase itself.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

In some aspects, the techniques described herein relate to an aircraft entryway including: a door receivable into an entryway opening, the door when deployed presenting a plurality of steps; a handle located on a first side of the entryway opening, the handle being located in a handle recess made into an interior structure such that the handle avoids projection into the entryway opening; a first light source mounted into the interior structure located on the first side of the entryway opening, the first light source being aimed at one or more steps of the plurality of steps; a second light source being located on an opposite second side of the entryway, the second light source being aimed at one or more other steps not included in the one or more steps in the plurality of steps.

In some aspects, the techniques described herein relate to an aircraft entryway wherein the interior structure is a cabinet.

In some aspects, the techniques described herein relate to an aircraft entryway wherein the handle first light source is included in a first-light recess located below the handle recess.

In some aspects, the techniques described herein relate to an aircraft entryway wherein the handle recess is incorporated into a cover plate, the cover plate being received into an opening created into the interior structure.

In some aspects, the techniques described herein relate to an aircraft entryway wherein the first light source is incorporated into the cover plate along with the handle.

In some aspects, the techniques described herein relate to an aircraft entryway wherein the handle is angled downwardly and outwardly relative to the entryway.

In some aspects, the techniques described herein relate to an aircraft entryway wherein the handle is located proximate a vertical middle of the entryway.

In some aspects, the techniques described herein relate to an aircraft entryway wherein first light source is aimed downward, aft, and out of the entryway.

In some aspects, the techniques described herein relate to an aircraft entryway wherein the first light source generates a first pattern on the surfaces of an upper step in the plurality of steps.

In some aspects, the techniques described herein relate to an aircraft entryway wherein the first light source is included in a first-light recess located below the handle recess.

In some aspects, the techniques described herein relate to an aircraft entryway wherein the first-light recess for the first light source includes a bezel, the bezel having opposing upper, lower, and lateral faces all being configured to avoid blocking light received from the first light source.

In some aspects, the techniques described herein relate to an aircraft entryway wherein the second light source is aimed downward, forward, and out of the entryway.

In some aspects, the techniques described herein relate to an aircraft entryway wherein the second light source is aimed to generate a second pattern on the surfaces of a lower step in the plurality of steps.

In some aspects, the techniques described herein relate to an aircraft entryway wherein the second light source is aimed to generate a second pattern on the surfaces of a lowest step and a middle step in the plurality of steps.

In some aspects, the techniques described herein relate to an aircraft entryway wherein the second light source is mounted into a portion of an outcropped portion of an additional interior structure, the portion forming form a face supporting the second light source such that the second light source is aimed at a step in the plurality of steps.

In some aspects, the techniques described herein relate to an aircraft entryway wherein the second light source is recessed into the portion of the face of the outcropped portion.

In some aspects, the techniques described herein relate to an aircraft entryway wherein one or more of the first and second light sources include light emitting diodes.

In some aspects, the techniques described herein relate to an aircraft entryway including: a stairway; a faceplate installed into an aircraft interior structure on a first side of the entryway; a first recessed area in the faceplate, the first recessed area including a handle; a second recessed area in the faceplate, the second recessed area including a first light source, the first light source being supported on a surface inside the second recessed area such that the first light source emits onto a step on the stairway.

In some aspects, the techniques described herein relate to an aircraft entryway including: a second light source mounted on an additional interior structure on a second side of the entryway, the second light source being mounted on an outcropped portion of the additional interior structure, the second light source being aimed to illuminate an additional second step on the stairway.

In some aspects, the techniques described herein relate to an aircraft entryway including: a door receivable into an entryway opening, the door when deployed presenting a plurality of steps; a first light source mounted into a first interior structure located on the first side of the entryway opening, the first light source being aimed at an upper step in the plurality of steps; and a second light source mounted into an additional interior structure located on an opposite second side of the entryway, the second light source being aimed at one or more other steps not included in the one or more steps in the plurality of steps.

BRIEF DESCRIPTION OF SEVERAL VIEWS OF THE DRAWINGS

Illustrative embodiments are described in detail below with reference to the attached drawing figures, which are incorporated by reference herein and wherein:

FIG. 2 shows a close-up perspective view of a recessed area created in a forward divider in the entryway shown in of FIG. 1A revealing aspects of the aircraft door handle and lighting system in more detail;

Figure 1A:
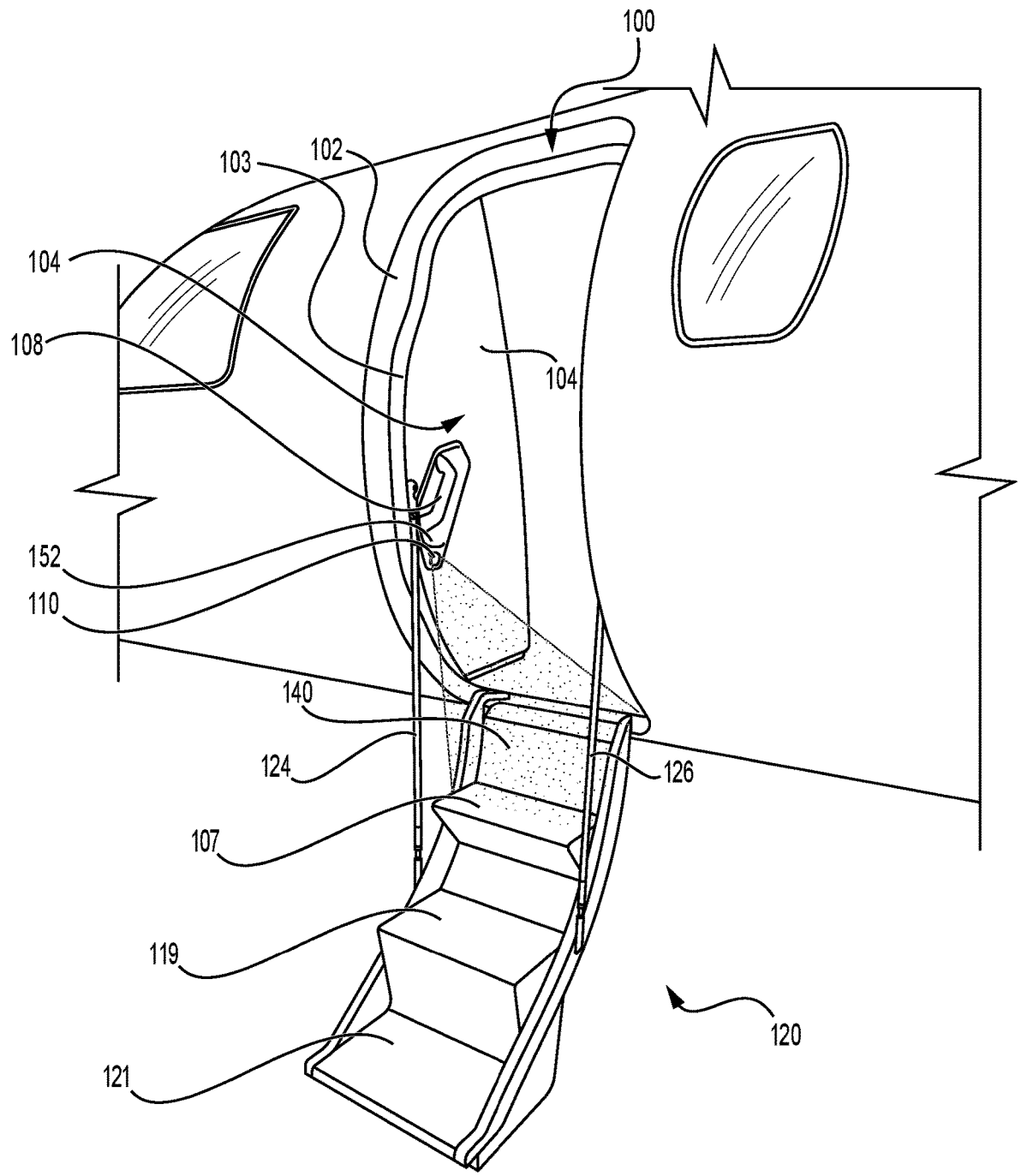
FIG. 1A shows a perspective view from the right of the aircraft door and entryway including a handle and lighting system.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Embodiments disclosed herein include a system and a method for providing a handle and an illumination element for an aircraft door entryway, in combination with an overall lighting arrangement. Current aircraft doors, when opened, may not include a handle presented for a user to grasp for stability when entering or exiting an aircraft. Additionally, current aircraft door arrangements may lack inefficient or insufficient lighting systems. A system on an aircraft door is needed which includes a handle and a lighting arrangement to increase passenger safety.

In embodiments, an aircraft door handle and lighting system are disclosed. The disclosed embodiments include a door handle and a first light source (which in embodiments is an LED light source) which are both recessed thus avoiding interference with ingress or egress through the doorway opening. In embodiments, the handle and the first light source are installed onto an aircraft interior structure on one side of the entry way (e.g., installed into a cabinet or divider). In still more specific embodiments, both the handle and the first light source are included within independent recessed areas. In embodiments, the aircraft interior structure in which the handle and first light are installed is on the front side of the entry way. In terms of the first light source, it may be, in embodiments, recessed in such a way that the surrounding structures do not block light directed towards the one or more steps. In further embodiments, these recessed areas are established in a face plate mounted to the interior aircraft surface, the face plate being inserted into an aperture formed through the skin of a cabinet or divider.

In embodiments, the system also includes a second light source which is incorporated into a doorway-facing surface on an interior panel or a door trim on the aft side of the entryway. The second light source (an LED source in embodiments) may also be recessed, and also oriented within surrounding structures in a way which aims the light the desired direction. The second light source can additionally be incorporated such that emissions are not blocked before reaching the desired one or more steps to which the second light source is directed.

The illumination pattern generated by each of the first and second light sources may be configured to illuminate two distinct areas on the staircase when the aircraft door is in an open position. The door handle may be positioned and configured within a recessed area such that when the aircraft door is opened a user may grasp the handle for stabilization while entering or exiting the aircraft. Because the door handle and first light source are both recessed into the internal entryway structures (e.g., in FIG. 2 the forward side divider), they do not protrude into the entryway. Similarly, on the other side of the entry way, the recessed nature of the second aft light source also keeps it from protruding outward in a way that would interfere with entering or exiting passengers. Features that do protrude into the entryway may be hazardous to a user entering or exiting, and depending on design constraints, may interfere with opening and closing of the door, and the embodiments above avoid this.

FIG. 1A shows a perspective view taken from a righthand side of an aircraft entryway 100 including outer aircraft structures 102 which define a doorway. The aircraft entryway opening 100 is sized such that a human may enter or exit the aircraft. The outside of entryway 100 is defined by outer aircraft structures 102 (Aluminum in embodiments).

The entryway is generally rectangular shaped with four rounded corners. Aircraft entryway 100 is created from the opening created by the aircraft outer aircraft structures 102 and also includes a door frame 103. The forward side of entryway 100 includes an interior aircraft structure, e.g., an interior cabinet or divider 104. The forward side of entryway 100 includes interior structures (a divider is shown in FIG. 1A) 104 having a substantially flat entryway-facing surface 102. A face plate 152 is installed into surface 104. The face plate 152 is a mounted plate which is received into an aperture (not shown) existing in the divider 104, the aperture being made through the divider surface 104 and being sized to accommodate the inwardly extending nature required to establish a handle recessed area 106 and a first light handle recessed area recessed area 116 (see also FIG. 2). Recessed areas 106 and 116 are depressed into the surface of the face plate 152. The handle recessed area 106 on the face plate 152 includes a handle 108 configured within the handle recessed area 106. The first light source recessed area 116 in the face plate 152 may be formed as a bezel housing wherein a first light source 110 is embedded. The first light source recessed area 116 is located just beneath the bottom edge of the handle recessed area 106 on the face plate 152. The handle recessed area 106 is located at a strategic position on the interior divider skin 104 such that the handle 108 is presented to a user upon entry into or exit out of the aircraft entryway 100. The position of the handle also allows a user to grasp handle 108 for stabilization or support while entering or exiting the aircraft.

In embodiments, the handle recessed area 106 and thus handle 108 are positioned near the vertical center of the entryway 100, but in other embodiments the handle recessed area 106 may be configured in numerous other different positions around the entryway 100. The first light source 110—which is aimed outwardly, downwardly, and aft relative to the aircraft—is housed within the first light source recessed area 116 and angled to provide illumination in a first illumination pattern 140 which in embodiments, is directed towards a top step 107 of the staircase 120. In more specific embodiments, the first illumination pattern 140 is centered at the middle of and substantially illuminates the upper surfaces of the top step 107.

Figure 1B:
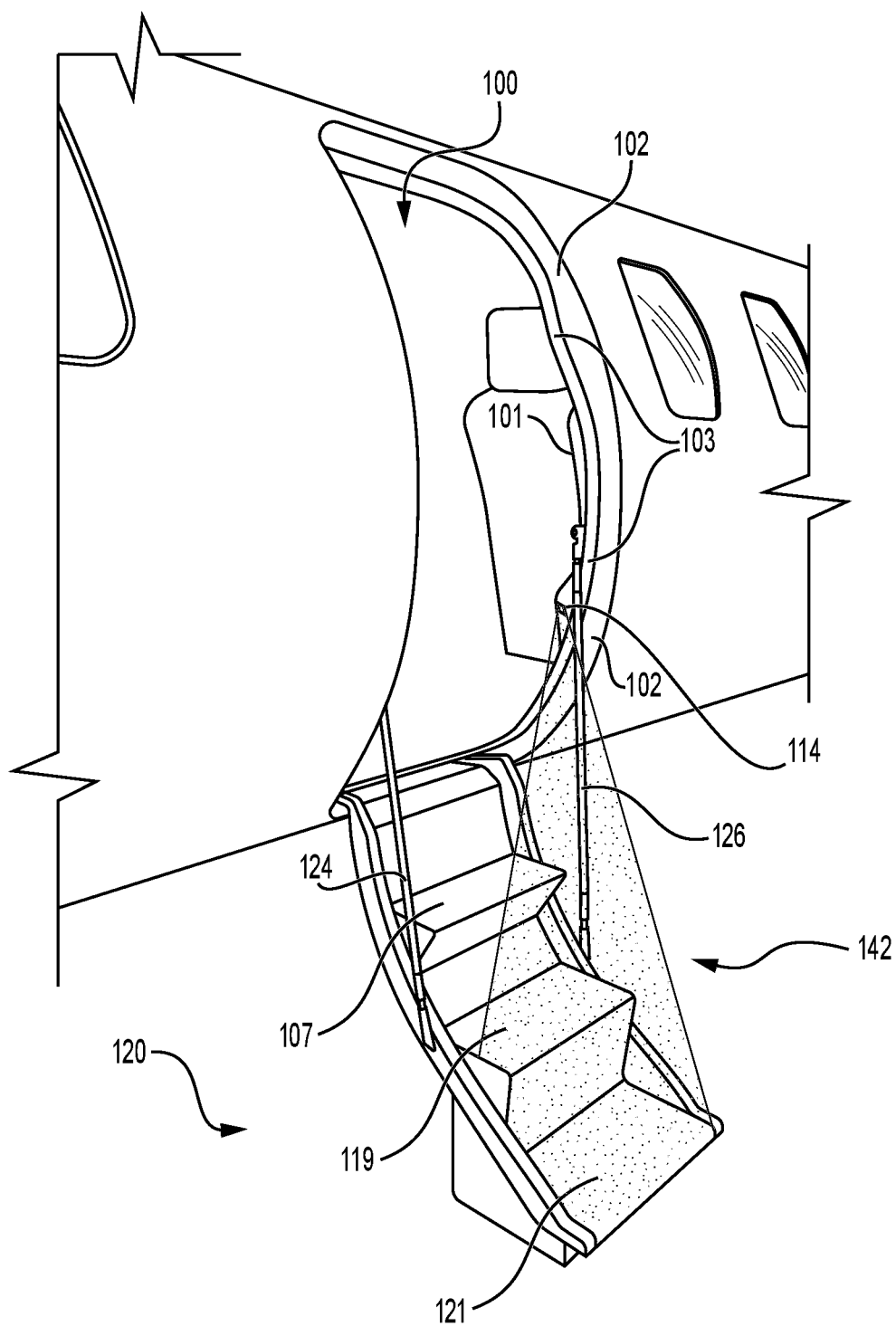
FIG. 1B shows a perspective view from the left of the same aircraft entryway shown in FIG. 1A.

FIG. 1B shows a perspective view taken from the aft side of aircraft entryway 100. The view shown in FIG. 1B reveals entryway 100 from the left. Here, again, frame 103 can be seen to be located on the inside of the aircraft outer structures 102, and is also inside of interior structures 101 (see also FIG. 4). A front face 117 of the interior structures 101 includes a second light source 114 which is directed downwardly, outwardly, and forwardly. The second light source 114 is included within a second light source recessed area 118. The light source emits light through an opening formed at the back of a bezel. This allows the second light source 114 to be embedded into the second light source recessed area 118 of internal aft surface 117 of the interior structures 101 of the aircraft entryway 100, in embodiments. The second light source 114 is configured within the second light source recessed area 118 to provide illumination in a second illumination pattern 142, which in embodiments, is out, down, and aft. More specifically, the second illumination pattern 142 in embodiments is created onto one or more of the second step 119, third step 121, or both the second step 119 and the third step 121 on the staircase 120. In embodiments, the pattern is created to substantially provide illumination to the surfaces of both steps 119 and 120 to a user.

In FIGS. 1A and 1B the illumination of the first and second illumination patterns 140 and 142 produced from the first and second light sources, light source 110 and light source 114 are configured to substantially avoid occlusion from the struts 124 and 126 attached on either side of the staircase 120. Both the first light source and second light sources 110 and light source 114 may also be configured to emit a particular desired level of light or be configured to be adjustable and produce varying amounts of illumination. The first and second light sources light source 110 and light source 114 may also include one or more light emitting diodes (LEDs) to provide the illumination.

FIG. 2 shows a closeup perspective view of face plate 152 depicted in FIG. 1A. As discussed, face plate 152 includes handle recessed area 106. Handle recessed area 106 is configured into the face plate 152 and intrudes into the interior divider skin of interior structure (divider) 104 of the aircraft entryway 100 forming a recessed area on the face plate 152. The handle recessed area 106 is shaped and elongated such that the also elongated handle 108 fits within the space intruded handle recessed area 106. Handle 108 is sized to not protrude out from the recessed area of the handle recessed area 106 and thus, also does not extend outwards into the aircraft entryway 100. The handle 108 includes an outwardly angled portion 111, a plateau portion used for gripping, 112, and an inwardly-angled portion 113. Handle 108 is configured such that the outwardly angled portion 111 is structurally attached to the recessed area floor 109 and oriented to extend at an angle away from the recessed area floor 109 and connect to the grip portion 112. The recessed area floor 109 is a substantially flat surface at the bottom of the handle recessed area 106 but could have other shapes so long is it does not interfere with a user gripping the handle 108. After the grip portion 112, the handle angles downward to reconnect with the area floor 109 at inwardly-angled portion 113 of the handle recessed area 106.

In terms of the configuration, the handle recessed area 106, includes a first upwardly angled face 144 and a second upwardly angled face 150 which are positioned on opposing sides of the handle recessed area 106 and each rise at an angle from the recessed area floor 109 to reach the surface of the face plate 152. First and second upwardly angled faces 144 and 150 also extend longitudinally relative to the handle length, and form the biggest sides of the handle recessed area 106.

On a first end of the first upwardly angled face 144 and the second upwardly angled face 150, a curved end 149 arcs from each end of the side faces 144 and 150 and arcs around the inwardly angled portion 113 of the handle 108 which forms a first end of the handle recessed area 106. The curved end 149 is angled and rises upwards from the recessed area floor 109 to the outwardmost substantially planar surface 123 of the face plate 152. On a second end of the sides 144 and 150, and opposite curved end 149, a third upwardly angled face 146 and a fourth upwardly angled face 148 each rise upwards from the recessed area floor 109 to the outermost substantially planar surface 123 of the face plate 152. The third upwardly angled face 146 is joined to the second end of the first upwardly angled face 144 and the fourth upwardly angled face 148 is joined to the second end of the second upwardly angled face 150. The third and fourth upwardly angled faces 146 and 148 are connected to form a second end to enclose the handle recessed area 106 opposite of the curved end 149 and are configured to curve or arc around the outwardly angled portion 111 of the handle 108. The face plate 152 forms an edge (which is a part of the outermost substantially planar surface 123) along the upper edges of the upwardly angled faces of the handle recessed area 106 which is separate from the interior divider skin 104.

In embodiments, the upwardly angled faces of the handle recessed area 106 form an elongated irregular shape in which the first upwardly angled face 144 and the second upwardly angled face 150 form the long sides with the curved end 149 creating a first curved pointed end and the third upwardly angled face 146 and fourth upwardly angled face 148 forming a second curved pointed end. The handle recessed area 106 is shaped substantially around handle 108 and with length and curvature to allow the handle 108 to fit within the handle recessed area 106. In embodiments, the handle recessed area 106 and the handle 108 are two separate pieces which are mounted together onto the interior structures. More specifically, handle 108 is mounted into supporting structures behind the face plate 152, and the face plate 152 is mounted into receiving areas defined into the divider 104.

The first light source light source110 is configured on the face plate 152 just below the curved end 149 of the handle recessed area 106. In embodiments, the first light source 110 is housed within a first light recess area 116 which may be formed as a bezel which is embedded into the interior divider skin 104. The first light source 110 is configured to direct illumination towards the entry step 107 (FIG. 1A), which is the step positioned to lead up to the aircraft outer aircraft structures 102. The first light source 110 may be configured with a light emitting diode or a plurality of light emitting diodes to provide illumination in embodiments. In other embodiments, the first light source 110 may include numerous other elements or devices configured to produce illumination. In embodiments, the handle recessed area 106 may be fabricated from a leather material and the handle 108 may be formed from a suitable material such as a plastic or a metal. In embodiments, face plate 152 may be fabricated from a plastic or other suitable material.

Figure 3:
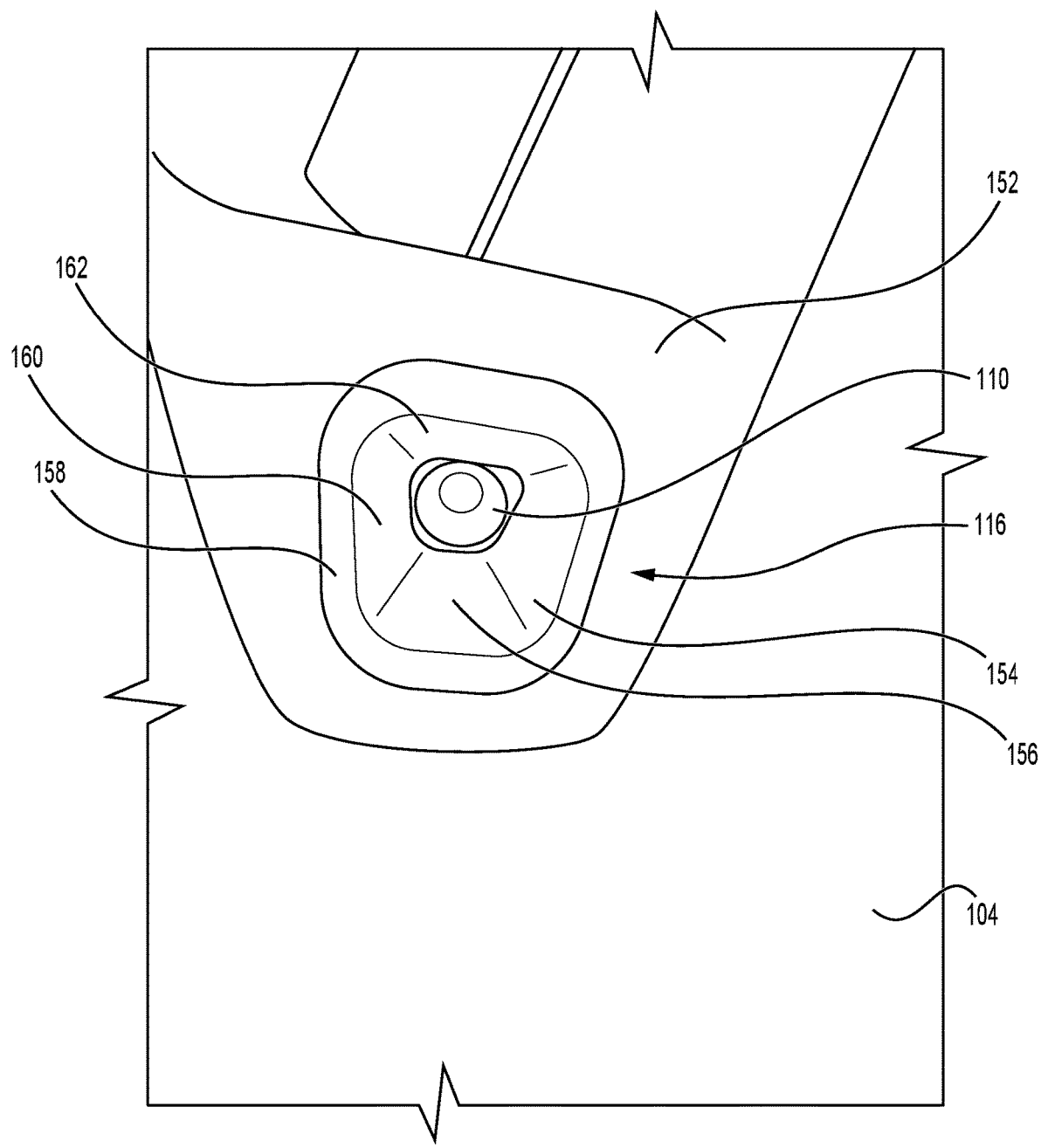
FIG. 3 shows a close-up perspective view of a recessed light on the divider of FIG. 2 for the aircraft door handle and lighting system.

FIG. 3 shows a closeup perspective view of the first light source 110 housed within a first light source recessed area 116 on the face plate 152. The first light source recessed area 116 is configured just beyond the edge of the curved end 149 of the handle recessed area 106 and is embedded into the face plate 152 on the interior divider skin 104. The bezel forming the first light source recessed area 116 includes an upper edge trim 158 and includes a lower upwardly angled face 154, lateral outwardly angled faces 160 and 154, and an upper fourth, outwardly angled face 162. Bezel faces 154, 160, 156, and 162 form the sides of the first light source recessed area 116 and are configured along their upper edges to level up to the upper edge trim 158 to form a generally square shape. Bezel faces 154 and 160 are opposed to each other and the faces 156 and 162 are opposed to each other. Of special note, lower bezel face 156 is longer and angled relative to vertical at a lesser extent than is upper face 162. This accommodates the downward orientation/aiming of first light source 110 by not blocking the light emitted. Similarly, lateral faces 154 and 160 are angled in a way to avoid blocking of the first light source to accommodate the ed The faces 154, 160, 156, and 162 angle downwards from their upper edge such that each face gives clearance to the first light source 110 positioned at the bottom of the first light source recessed area 116.

Functionally, bezel faces 154, 160, 156, and 162 are configured to allow the first light source 110 to be angled within the first light source recessed area 116 to create the first illumination direction/pattern 140 (FIG. 1A) without blocking the illumination pattern projected out from the first light source 110. Bezel faces 154, 160, 156, and 162 are configured to flare outwards away from the first light source 110 allowing the system to direct illumination from the first light source 110 in the first illumination pattern 140. In embodiments, the first light pattern 140 is angled to direct illumination towards and illuminate towards the center of the top step 107 outwards to the edges of that step.

Figure 4:
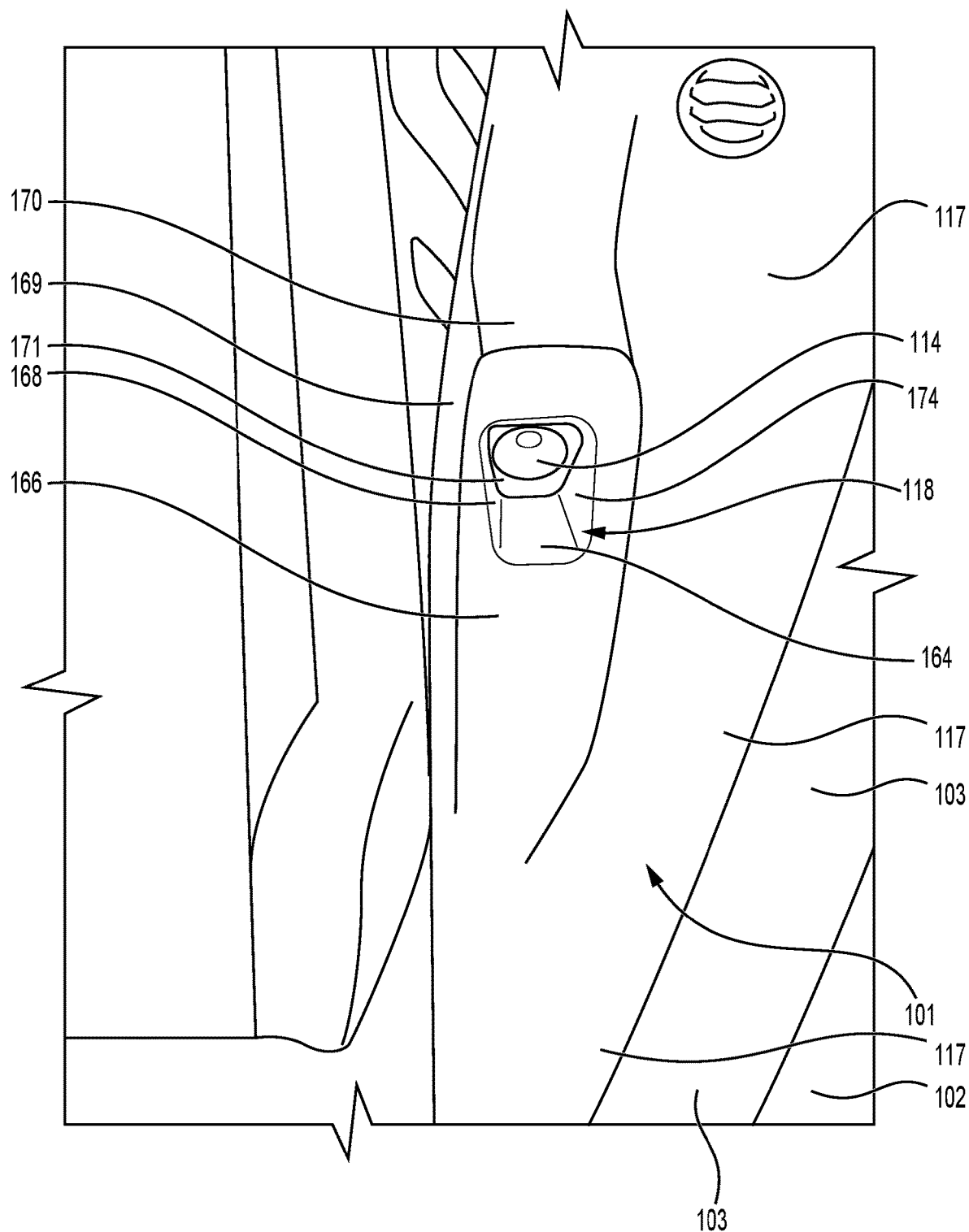
FIG. 4 shows a close-up perspective view of an additional recessed light on the aft side of the doorframe shown in FIG. 1B.

FIG. 4 shows a close-up perspective view of the second light source 114 housed within the second light source recessed area 118. The second light source recessed area 118 is configured on an interior, aft surface of the interior aircraft structures 101 of the aircraft entryway 100. The aft side of the interior aircraft structures 101 includes a raised portion 170 which extends outwards and raises away to be outcropped from the surface 117 of the interior aircraft structures 101 (i.e., which is slightly directionally forward in the aircraft with respect to FIG. 1B), but does not interfere with the aircraft entryway 100. At the upper edge of the raised portion 170 a downwardly sloped portion 166 slopes downwards from the outcropped upper edge of the raised portion 170 towards the surface of the outer aircraft structures 102. The slope of the downwardly sloped portion 166 creates a downward facing surface. Along the inner edge of the raised portion 170 and the downwardly sloped portion 166 is a curved portion 169 with a profile which follows and mirrors the slope upwards of the raised portion 170 and the downward slope of the downwardly sloped portion 166 and curves towards the exterior of the aircraft. The curved portion 169 allows for the downward directed surface of the downwardly sloped portion 166 to, while being directed downward, be also angled and directed outwardly through the entry way towards the exterior of the aircraft and towards the staircase 120 (FIG. 1B). The second light source recessed area 118 is configured onto the downwardly and outwardly directed surface of the downwardly sloped portion 166. The second light source recessed area 118 includes a first internal face 168 which opposes a second internal face 174. A third internal face 164 is configured to be perpendicular on each end of the faces 168 and 174 and is positioned to the ends of the first internal face 168 and the second internal face 174, thus forming an end to the substantially rectangular shaped second light source recessed area 118. A floor 171 begins from the bottom edge of the third internal face 164 and is angled upwards to flow to the upper edge of the second light source recessed area 118. The angle of the second light source recessed area floor 171 faces downwardly and outwardly relative to the entryway, which aids in directing illumination from the second light source 114 down onto the steps and out the door. The second light source 114 is embedded into the second light source recessed area floor 171 consistent with an illumination the second light pattern 142 which in embodiments, is directed specifically towards the mid and lower steps 119 and 121. The first, second, and third internal faces 168, 174, and 164 are configured to not intersect the illumination or light cone emitted from the second light source 114 and are angled to direct illumination into the second pattern 142 substantially towards the center of the steps 119 and 121 as can be seen in FIG. 1B.

Users typically pass through the entry way when the aircraft is grounded and the staircase 120 is deployed. While passing through, the user may grasp the handle 108 within the handle recessed area 106 on the interior divider skin 104 of the aircraft entryway 100. Handle 108 is located to provide a user with stabilization while walking into or out of an aircraft cabin through aircraft entryway 100. The first light source 110 and the second light source 114 together provide patterns 140 and 142 which substantially illuminate all three steps (steps 107, 119 and 121) for the benefit of a passenger using staircase 120. Each of the first light source 110 and second light sources 114 may include one or more light emitting diodes to provide directed illumination in the first illumination direction 140 and the second illumination direction 142. Alternatively, other light sources, e.g., incandescent, etc., could be used and still fall within the broad objectives of the disclosed embodiments.

Figure 5:
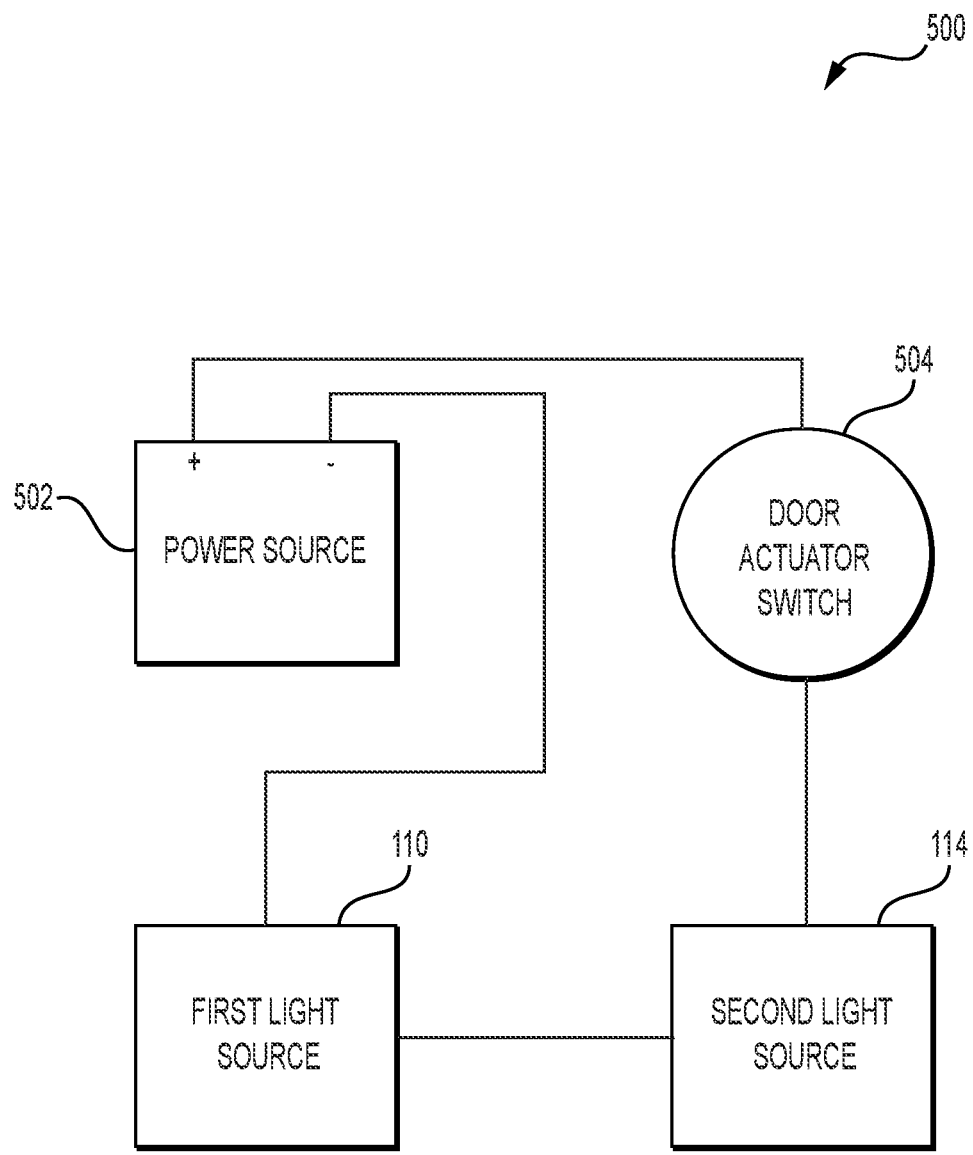
FIG. 5 is a schematic showing an electrical system supporting the lighting systems revealed in FIGS. 1A, 1B, and 2-4.

FIG. 5 provides an exemplary embodiment for an electrical system 500 which could be used to support the powering, activation and deactivation of the first light source 110 and second light source 114. Referring to the figure, it may be seen that a power source 502 is wired to connect to a door activation system 504. The door activation system may be a button or switch allowing a user to open the aircraft door which may provide power to the first light source 110 and second light source 114 connected in series. Alternately, the door activation system 504 may not be configured with the aircraft door and may only allow a user to provide power and turn on the first light source 110 and second light source 114.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. An aircraft entryway comprising:
   a door receivable into an entryway opening, the door when deployed presenting a plurality of steps;
   a handle located on a first side of the entryway opening, the handle being located in a handle recess in an interior structure such that the handle avoids projection into the entryway opening;
   a first light source mounted into the interior structure located on the first side of the entryway opening, the first light source being aimed at one or more steps of the plurality of steps;
   a second light source being located on an opposite second side of the entryway, the second light source being aimed at one or more other steps not included in the one or more steps of the plurality of steps.

2. The aircraft entryway of claim 1 wherein the interior structure is a cabinet.

3. The aircraft entryway of claim 1 wherein the first light source is included in a first-light recess located below the handle recess.

4. The aircraft entryway of claim 1 wherein the handle recess is incorporated into a cover plate, the cover plate being received into an opening created into the interior structure.

5. The aircraft entryway of claim 4 wherein the first light source is incorporated into the cover plate along with the handle.

6. The aircraft entryway of claim 1 wherein the handle is angled downwardly and outwardly relative to the entryway.

7. The aircraft entryway of claim 1 wherein the handle is located proximate a vertical middle of the entryway.

8. The aircraft entryway of claim 1 wherein the first light source is aimed downward, aft, and out of the entryway.

9. The aircraft entryway of claim 8 wherein the first light source generates a first pattern onto an upper step of the plurality of steps.

10. The aircraft entryway of claim 8 wherein the first light source is included in a first-light recess located below the handle recess.

11. The aircraft entryway of claim 10 wherein the first-light recess for the first light source includes a bezel, the bezel having opposing upper, lower, and lateral faces all being configured to avoid blocking light received from the first light source.

12. The aircraft entryway of claim 1 wherein the second light source is aimed downward, forward, and out of the entryway.

13. The aircraft entryway of claim 1 wherein the second light source is aimed to generate a second pattern onto a lower step of the plurality of steps.

14. The aircraft entryway of claim 1 wherein the second light source is aimed to generate a second pattern onto a lowest step and a middle step of the plurality of steps.

15. The aircraft entryway of claim 1 wherein the second light source is mounted into a portion of an outcropped portion of an additional interior structure, the portion forming a face supporting the second light source such that the second light source is aimed at a step of the plurality of steps.

16. The aircraft entryway of claim 15 wherein the second light source is recessed into the portion of the face of the outcropped portion.

17. The aircraft entryway of claim 1 wherein one or more of the first and second light sources comprise light emitting diodes.

18. An aircraft entryway providing entry from an exterior of the aircraft comprising:
   a stairway;
   a faceplate installed into an aircraft interior structure on a first side of the entryway;
   a first recessed area in the faceplate, the first recessed area including a handle;
   a second recessed area in the faceplate, the second recessed area including a first light source, the first light source being supported on a surface inside the second recessed area such that the first light source emits onto a step on the stairway.

19. The aircraft entryway of claim 18 comprising:
   a second light source mounted on an additional interior structure on a second side of the entryway, the second light source being mounted on an outcropped portion of the additional interior structure, the second light source being aimed to illuminate an additional second step on the stairway.

20. An aircraft entryway comprising:
   a door receivable into an entryway opening, the door when deployed presenting a plurality of steps;
   a first light source mounted into a first interior structure located on a first side of the entryway opening, the first light source being aimed at an upper step of the plurality of steps; and a second light source mounted into an additional interior structure located on an opposite second side of the entryway, the second light source being aimed at one or more other steps of the plurality of steps and not at the upper step, and wherein the first interior structure is a cabinet or divider.

\* \* \* \* \*